(12) United States Patent
Kessler et al.

(10) Patent No.: US 8,600,607 B2
(45) Date of Patent: Dec. 3, 2013

(54) METHOD FOR ALLOCATING IDENTIFIERS OF WHEEL ELECTRONICS OF A TIRE PRESSURE MONITORING SYSTEM OF A VEHICLE TO THE POSITIONS OF THE WHEELS ON THE VEHICLE

(75) Inventors: Ralf Kessler, Pfinztal (DE); Andreas Kraft, Gondelsheim (DE); Markus Wagner, Ludwigsburg (DE); Juergen Schoenbeck, Bretten (DE); Peter Brand, Kieselbronn (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 99 days.

(21) Appl. No.: 13/228,741

(22) Filed: Sep. 9, 2011

(65) Prior Publication Data
US 2012/0065832 A1    Mar. 15, 2012

(30) Foreign Application Priority Data
Sep. 13, 2010   (DE) .......................... 10 2010 037 510

(51) Int. Cl.
*G01M 17/00*   (2006.01)

(52) U.S. Cl.
USPC ................ 701/29.1; 701/36; 701/41; 701/72; 701/70; 340/442; 340/443; 340/444; 340/445; 340/447; 73/146.5; 73/146.4; 73/146.2

(58) Field of Classification Search
USPC .............. 701/36, 41, 38, 45, 96, 74; 340/442, 340/444, 447
See application file for complete search history.

(56) References Cited

U.S. PATENT DOCUMENTS

| 5,808,190 | A | | 9/1998 | Ernst |
| 5,982,279 | A | * | 11/1999 | Tominaga et al. ............ 340/444 |
| 6,064,936 | A | | 5/2000 | Nakajima |
| 6,181,241 | B1 | * | 1/2001 | Normann et al. ............. 340/447 |
| 6,633,229 | B1 | * | 10/2003 | Normann et al. ............. 340/447 |
| 6,694,227 | B2 | | 2/2004 | Nowottnick et al. |
| 7,023,334 | B2 | | 4/2006 | Fischer et al. |
| 7,313,953 | B2 | * | 1/2008 | Hernando et al. ............ 73/146.5 |
| 2004/0055370 | A1 | * | 3/2004 | Normann et al. ................ 73/146 |
| 2004/0243293 | A1 | * | 12/2004 | Tominaga et al. ............. 701/41 |
| 2011/0113876 | A1 | | 5/2011 | Kammann |

* cited by examiner

*Primary Examiner* — Redhwan k Mawari
(74) *Attorney, Agent, or Firm* — Hackler Daghighian & Martino

(57) ABSTRACT

The invention describes a method for allocating identifiers of wheel electronics of a tire pressure monitoring system to positions of wheels of a vehicle, the simultaneously occurring rotation speeds of the wheels, normalized on a consistently chosen rolling radius of the wheels differ during cornering because of the different positions of the wheels on the vehicle, so that the positions of the wheels can be sorted according to increasing speed of the wheels during cornering, the wheel electronics of each wheel comprising a pressure sensor, a motion sensor, a memory and a transmitter, which transmits signals to a receiver being connected to an evaluation device, which receives the transmitted identifiers and compares the distances which the corresponding wheels have traveled in a defined time span, sorts the identifiers according to the length of the distance traveled in the defined time span and allocates the identifiers to the wheel positions.

19 Claims, No Drawings

METHOD FOR ALLOCATING IDENTIFIERS OF WHEEL ELECTRONICS OF A TIRE PRESSURE MONITORING SYSTEM OF A VEHICLE TO THE POSITIONS OF THE WHEELS ON THE VEHICLE

The invention concerns a method for allocating identifiers, which are contained in signals emitted by units of a tire pressure monitoring system of a vehicle, which are arranged on the wheels of the vehicle, to the positions of wheels, which are mounted on the vehicle. In the following text, these units which are mounted on the wheels of the vehicle are called wheel electronics. Each wheel electronic comprises a pressure sensor, which is sensitive to the tire pressure of the wheel, a motion sensor, in particular an acceleration sensor, which provides information on the rotation speed of the wheel, a memory, in which an individual identifier of the wheel electronic is stored, and a transmitter, which transmits signals, which not only contain the individual identifier, but also the information on the rotation speed of the respective wheel, to a receiver, which is fitted with or connected to an antenna provided on the body of the vehicle as well as fitted with or connected to an evaluation device. The antenna is usually mounted on the underside of the vehicle body. The antenna can be connected by means of a cable to the receiver which decodes the received signals and may amplify them and/or prepare them otherwise. The receiver may also be combined to the antenna in an assembly. The evaluation device is generally arranged at a distance from the antenna in the engine bay or in the interior of the vehicle, for instance behind the dashboard. The receiver can be combined to the evaluation device in an assembly or be separately from it. The receiver can also be split into a part associated with the antenna and a part associated with the evaluation device.

The evaluation device, sometimes also called central unit of the tire pressure monitoring system, evaluates the signals transmitted by the wheel electronics units and shows anomalies of the tire pressure to the driver. The evaluation device is usually connected to a display unit provided in the dashboard of the vehicle. The connections between the evaluation device and the display unit and to the receiver are usually provided by cables, for instance a bus system provided in the vehicle.

For the evaluation device to be able to display, on which wheel an anomaly of the tire pressure occurs, it must know, on which wheel a wheel electronic is arranged, which signals the anomaly of the tire pressure. For this purpose, the wheel electronics transmit in their signals along with information on the tire pressure also an individual identifier, which usually consists of a digit sequence. For the evaluation device to be able to allocate a transferred digit sequence to a certain wheel or to a certain wheel position, the identifiers of the wheel electronics mounted in the vehicle and the allocation thereof with respect to the wheel positions must be communicated to said device and stored in memory. Allocation methods are known to that end.

EP 0 806 306 B1 discloses wheel electronics comprising a motion sensor, that is an acceleration sensor reacting to radial accelerations and/or tangential accelerations occurring on the wheel. Such an acceleration sensor not only enables to differentiate between a parked vehicle and a stopped vehicle, but also provides information on the rotation speed of the wheel as the gravitational acceleration is superimposed to the radial acceleration and the tangential acceleration of a wheel. The influence of gravitational acceleration changes its sign twice with every rotation of the wheel. The reciprocal of the time span between any two sign changes of the superimposition of the acceleration signal caused by the gravitational acceleration is proportional to the rotation speed of the wheel.

The method disclosed in EP 0 806 306 B1 compares the rotation speed acquired by the acceleration sensor in the wheel electronics with the rotation speeds provided by ABS sensors for the wheels of the vehicle for the same time span. If matching of the rotation speed measurement originating from the wheel electronics with a rotation speed measurement originating from an ABS sensor can be noticed, the ABS sensor and the corresponding wheel electronic are then assumed to be allocated to the same wheel position, for instance in the front left on the vehicle. A requirement is that the rotation speed measurement originating from the wheel electronic matches a rotation speed measurement originating from only one of the ABS sensors. The identifier is then stored for the position of the ABS sensor, from which the matching rotation speed signal originated. The evaluation device then knows for future signals containing the same identifier, from which wheel or from which wheel position, for example front left, the signal originates.

The known allocation method presupposes that the wheels have differences in terms of rotation speeds when comparing the rotation speeds. These differences can have various origins, for instance slippage between wheel and roadway, different rolling radii caused by different tire sizes or by different loads or by different tire pressures and in particular by cornering. Wheels on the outside of a curve always travel over a longer distance than wheels on the inside of the curve and therefore rotate faster than the wheels on the inside of the curve. The differences in rotation speed between the wheels of a vehicle can be minimal, even vanishingly minimal when driving straight. EP 0 806 306 B1 therefore requires a rotation speed value measured by the acceleration sensor in a wheel electronic and a rotation speed value measured by an ABS sensor, are only regarded as matching when they agree within disparities which are unavoidable from a measuring viewpoint. Only if such an excellent matching is noticed once for only one of the ABS sensors, the identifier of the wheel electronics is exactly assigned to this ABS sensor, which has delivered the matching rotation speed signal. This has the shortcoming that it may take a long time before the evaluation device has allocated all the received identifiers to a certain ABS sensor and hence to a certain wheel position. The known method is moreover prone to erroneous allocations. But as long as the identifiers of the wheel electronics mounted on the vehicle are not allocated to the wheel positions accurately, no reliable tire pressure control is possible. The method disclosed in EP 0 806 306 B1 has therefore not found its way in practice.

Another automatic allocation method is disclosed in DE 198 56 861 B4. This method enables quick unequivocal allocation of the identifiers to the wheel positions, via the evaluation of information on the rotation direction, which is delivered by an acceleration sensor in the respective wheel electronics, and of received signal levels. This requires however the receiving antenna to be arranged at an eccentric location of the vehicle body floor so that the signals, which are sent by the wheel electronics with the same intensity, are received by the receiving antenna with different signal levels. Although this method offers the possibility of a quick and reliable allocation, it cannot be used if a central position is desired for the receiving antenna, on which it can receive signals from all directions equally well. This may be desired if, for instance, the receiving antenna is also used for receiving the signals of a radio key, which can hit the receiving antenna from any direction.

An object of the present invention is to create an allocation method which is more reliably and/or faster than the method disclosed in EP 0 806 306 B1.

SUMMARY OF THE INVENTION

The method according to the invention allocates identifiers, which are contained in signals emitted by wheel electronics of a tire pressure monitoring system of a vehicle, to the positions of the wheels.

The method uses wheel electronics, each of them containing a pressure sensor being sensitive to the tire pressure of the wheel, a motion sensor providing information on the rotation speed of the wheel, a memory storing the individual identifier of the wheel electronic, and a transmitter, which transmits signals containing the individual identifier and the information on the rotation speed of the respective wheel, to a receiver. The receiver is fitted with or connected to an antenna provided on the body of the vehicle as well as fitted with or connected to to an evaluation device.

The evaluation device identifies the transmitted identifiers and compares the distances which the corresponding wheels have traveled in a defined time span, sorts the identifiers according to the length of the distance traveled in the defined time span, and allocates the identifiers to the wheel positions in such a way that the identifier, for which the longest distance has been traveled in the defined time span, is allocated to that wheel position, in which the longest distance is expected during cornering, and that the identifier, for which the shortest distance has been traveled in the defined time span, is allocated to that wheel position, in which the shortest distance is expected during cornering.

The invention exploits the fact, that the wheels of a vehicle travel different distances during cornering. In the case of a vehicle with four wheels, among which both front wheels are steerable, the left rear wheel travels the shortest distance when left cornering. The left front wheel travels a slightly greater distance than the left rear wheel. The right rear wheel travels a slightly greater distance than the left front wheel and the right front wheel travels a slightly greater distance than the right rear wheel. Providing that the rolling radii of the wheels are the same, the rotation speeds of the wheels differ accordingly during cornering. The wheel, which travels the longest distance during cornering, has the highest rotation speed and makes more rotations in a defined time span during cornering than the wheel which travels the shortest distance in the same curve. The method according to the invention therefore is suitable for all vehicles whose wheels, according to their different positions on the vehicle, have—in case of a matching rolling radius—during cornering different rotation speeds or a different number of wheel rotations in a defined time span. If the wheels of the vehicle should differ in the rolling radius, for instance because larger tires are provided for the wheels on the rear axle than for the wheels on the front axle, or because tires of the same size are prescribed for all the wheels, but the tires on the driven wheels wear faster and are replaced earlier than the tires on the non-driven wheels, it is then advisable to take this element into account in the method according to the invention. In such a case, the different rolling radii of the wheels can be taken into account when comparing the rotation speeds of the wheels or when comparing the number of rotations of the wheels occurring in a defined time span in such a way that the rotation speeds or the number of the rotations of the wheels are normalized on a rolling radius chosen consistently for the vehicle, before comparing the rotation speeds or the number of the rotations of the wheels to one another. The normalization has the effect that the comparison can take place as if all the wheels had the same rolling radius.

The invention has significant advantages:

The method according to the invention is more reliable than the method disclosed in EP 0 806 306 B1 it is not based on only one rotation speed measurement because for allocating the identifier of a wheel electronic to a wheel position, but can evaluate the length of the distances, which occurs when driving through a curve, whereas the defined time span, over which the distances are measured, can extend practically over the whole duration of the cornering or even over several cornerings. For instance, a cornering can be detected by means of a steering angle sensor and can be communicated to the evaluation device. Several consecutive measurements can therefore also be considered.

Nontheless, the method according to the invention leads faster to a complete allocation of the wheel electronics of a vehicle to the different wheel positions, because even individual measurements which by themselves do not provide unequivocal information about the wheel position to which a certain identifier belongs, contribute to the final result of the allocation method as the results of the individual comparisons are summed up.

As the number of rotation speed measurements and of measurements of numbers of rotations of the wheels increases, certain allocations, which occur strikingly often, more often than other allocations, become apparent in the method according to the invention. These allocations, which strikingly often occur, are hence significantly predominant, are the sought-after allocations.

In particular in case of cornering, the evaluation over as short as possible time periods has the advantage that the differences of the distances of all individual measurements made while driving through a curve contribute to the final allocation. It is therefore advantageous to select the time periods to be so short that when driving through a curve several consecutive individual measurements of the rotation speed of the wheels can be carried out; the method according to the invention then leads as quickly as possible to a reliable allocation result. If in contrary thereto the time periods for the individual measurements of the wheel rotation speed were selected so long that they may contain the passing through more than one curve, then differences in rotation speed, which for instance occur when driving through a left curve, might be negated by reversed differences in rotation speed when driving through a right curve immediately after. It is therefore preferable to carry out the wheel rotation speed measurements in as short as possible time periods.

If all the identifiers but one identifier are allocated to their wheel positions, the last unallocated identifier can readily be allocated to the last unallocated wheel position. Wheel electronics of spare wheels carried in the vehicle are not taken into account since they do not deliver any rotation speed signal.

The method according to the invention is particularly suitable for tire pressure monitoring systems wherein the receiving antenna is installed on such a central location of the body of the vehicle that it can receive signals of a radio key from all directions with the same good quality and hence also receives the signals originating from the wheel electronics (apart from the influences of the rotation of the wheels) not with truly different intensities.

According to the invention, the allocation can be derived solely from the signals of the wheel electronics even with a centrally arranged receiving antenna.

Additional signals from ABS sensors are admittedly (as will be described more in detail below) useful in some cases, but unnecessary in principle.

DETAILED DESCRIPTION

The invention is particularly suitable for two-axle vehicles, also for vehicles with twin wheels. The invention can also be used in vehicles with more than two axles if the wheel positions enable to determine in which sequence the size of the rotation speeds on the wheel positions can be expected.

In so far as the identifiers for the wheels on the right side of the vehicle can be allocated independent of the identifiers for the wheels on the left side of the vehicle and the vehicle has not several axles with steered wheels, the invention is quite suitable for multi-axle vehicles.

The distance measurements are preferably acquired using the rotation speeds of the wheels, especially in such a way that the evaluation device compares the information transferred along with the identifiers and transmitted to the evaluation device, on the number of rotations of the wheels occurring in a defined time span, sorts the identifiers according to the increasing number of rotations of the wheels, a number which is normalized on a consistently chosen rolling radius, and allocates the identifier to the wheel positions in such a way that the identifier, for which the largest normalized number of rotations has been observed, is allocated to the wheel position in which the largest normalized rotation speed is expected during cornering, and that the identifier, for which the smallest normalized number of rotations has been observed, is allocated to that wheel position, in which the smallest normalized rotation speed is expected during cornering.

If when driving through a left curve it is expected due to the arrangement of the wheels on the vehicle that the left rear wheel travels the shortest distance and hence performs the least rotations when driving through the curve while the right front wheel goes through the longest distance and must perform the most rotations, then the identifier of the wheel electronic whose motion sensor delivers the largest rotation speed signal or the largest number of wheel rotations in the defined time span, is allocated to the right front wheel, while the identifier of the wheel electronic, whose motion sensor delivers the smallest rotation speed or the smallest number of wheel rotations in the defined time span, is allocated to the left rear wheel. The identifiers of both remaining wheel electronics are allocated to both remaining wheel positions, i.e. rear right and front left, in the corresponding sequence of the magnitude of the rotation speeds or of the numbers of rotations they provide.

The defined time span is preferably selected in such a way that in the increasing series of the observed numbers of rotations of the wheels, the ratio between any two consecutive rotational speeds exceeds a preselected first threshold value, which is preferably derived from empirical values. Experience shows that the value 1.004, especially the value 1.006, is appropriate for the first threshold value, i.e. that the larger of two neighboring numerical values in the increasing series, which specify the number of rotations of the wheels, is larger than the next smaller numerical value by at least 0.4%, preferably by at least 0.6%. The reliability of the allocation is preferably increased in such a way that the comparison of the number of rotations of the wheels is carried out repeatedly in consecutive defined time spans, that it is counted how often a certain identifier is respectively allocated to a certain wheel position as a result of the repeated comparisons, and that this certain identifier is stored under that wheel position to which it has been allocated most frequently. The more frequent the threshold value of 1.004, preferably of 1.006 is exceeded during repetition for a given allocation of an identifier to a given wheel position the more reliable is the result of the allocation. The most frequent allocation to a wheel position, at which the first threshold value is always exceeded, is then preferably stored in memory if the counted frequency is greater by a predetermined number than the frequencies of the allocation of the same identifier to the other wheel positions involved in the comparison.

The predefined number is preferably derived from empirical values. Preferably, the allocation of an identifier to a given wheel position is then stored in memory, if it has been counted at least 10 times, preferably 20 times more often than the allocation of the same identifier to the other wheel positions involved in the comparison.

The motion sensor is preferably an acceleration sensor. But the motion sensor could also be a piezoelectric sensor embedded in the tires, which generates an alternate voltage signal at every passing through the footprint (the tread shuffle) of the tire. WO 2009/027424 A1 discloses such a motion sensor.

It is particularly preferable to perform the method according to the invention for the wheels on the left side of the vehicle separately from the wheels on the right side of the vehicle. For a usual vehicle fitted with four wheels, only a comparison between the distances traveled by the front wheel and the rear wheel on the same side needs to be done for the allocation on either side. This makes the allocation easier and faster.

The distinction between the wheels on the right side of the vehicle and the wheels on the left side of the vehicle is possible in an easy way, in that a motion sensor is provided in the wheel electronics, which sensor not only delivers information on the rotation speed of the wheel, but also information on the rotation direction. This is possible with acceleration sensors, in particular with piezoelectric acceleration sensors which deliver a voltage signal with a positive sign for one rotation direction and a voltage signal with a negative sign for the opposite rotation direction. For distinguishing the wheels on the right side from those on the left side of the vehicle, it should only be ensured that the wheel electronics are mounted as usual identically on all the wheels. Then the voltage of a piezoelectric acceleration sensor on wheels on the left side has the opposite sign of the voltage signal of a piezoelectric acceleration sensor on a wheel on the right side of the vehicle. The wheel electronics theirselves provide in such a case information which two wheel electronics of a vehicle with four wheels are arranged on the same side of the vehicle and which identifiers these two wheel electronics have. To be able to allocate them unequivocally to the wheel positions a distinction needs to be made only between the front wheel and the rear wheel on the same side of the vehicle. This distinction results according to the invention from the observation of the different distances traveled by both these wheels when driving through a left curve or a right curve. In both cases, the front wheel travels the longer distance when driving through the curve, regardless of whether it is a left curve or a right curve. This makes it easier in particular to interpret the results of several consecutive measurements and to count, which wheel clearly more often travels the longer distances and hence is recognized as the front wheel.

Another embodiment of the method according to the invention also makes a distinction between left side wheels and right side wheels from the observation of the rotation direction of the wheels. For any two wheels, which are mounted behind one another on the same side of the vehicle, the difference of the distances is then determined, which both wheels have traveled in a defined time span. The greater distance is allocated to the front wheel and the smaller distance to the rear wheel. The cases, in which a certain identifier has been allocated to a front wheel of the vehicle, because the greater number of wheel rotations and hence the longer distance had been determined from the rotation speed signals of the wheel with this identifier, are preferably counted separately from the cases, wherein the same identifier has been allocated to a rear wheel. The identifier is finally stored under that wheel position for which the counted allocations first of all reach a preset second threshold value, which is also preferably derived from empirical values. The higher the threshold value, the more reliable the result, If the threshold value is equal to the number 50, good results can be achieved. The number 80 is preferably chosen as the second threshold value.

For determining the difference of the distances, which two wheels arranged on the same side of the vehicle have traveled in a defined time span, the individual allocations are preferably formed by carrying out two consecutive measurements of the rotational speeds for each of the two wheels mounted behind one another on the same side of the vehicle, which rotational speeds are normalized on a consistently chosen rolling radius, and the results for each of both wheels are subtracted from one another, and wherein the difference of the thus formed differences is thereafter calculated, which is a measurement for the difference of the distances, which both wheels have traveled in the defined time span.

The individual allocations of an identifier to a given wheel position then simply derive from a double subtraction of rotation speed values or of measurements of the number of wheel rotations. The evaluation device needs to carry out basic arithmetic operations only.

Wheel electronics often operate autonomously, i.e. they perform their measurement and transmission processes following an internal program. For obtaining meaningful measured values for the method according to the invention, only such signals transferred from the wheel electronics are preferably evaluated, which originate from wheels with the same direction of rotation and which are temporally close to one another. How large the possible time interval between signals emitted from the wheel electronics might be in order to produce a usable result during the evaluation, can be derived from empirical values. The time interval, which two signals emitted from the wheel electronics may have in order to be evaluated, is preferably smaller than 2 seconds. Signals, whose time lag is greater than 2 seconds, are preferably not included into the comparison according to the invention of the wheel rotation speed or of the rotational speeds of the wheels on one and the same side of the vehicle. This has proven quite a suitable avenue.

It has already been pointed out that wheels, which have different rolling radii, may affect the result of the method according to the invention. It is therefore preferable to check whether the vehicle has wheels which have different rolling radii, to compensate for their influence on the rotational speeds which they exert when driving through a curve. Different rolling radii of the wheels of a vehicle are preferably taken into account in such a way that the rotation speed acquired by means of a motion sensor or the number of rotations which occurred in a defined time span is normalized on a consistently chosen rolling radius for each wheel. The different rolling radii of the wheels can be acquired from rotation speed signals, which are allocated to the wheels, in that rotation speed signals of the wheels acquired during straight driving of the vehicle are compared to one another.

The presence of straight driving can be detected by fitting the vehicle with a steering angle sensor which constantly monitors the steering angle. If the steering angle is zero, the vehicle is traveling straight. The sensor can inform the evaluation device thereof, which hence has the opportunity to compare the rotation speeds of the wheels with one another during straight driving. Identical rolling radii should produce identical rotation speeds when driving straight. If not, the deviation is a measurement for the difference of two wheels in the rolling radius.

What is claimed is:

1. A method for determining the relative position of a wheel of a vehicle having an installed sensing unit for a tire pressure monitoring system, comprising:
   providing a plurality of sensing units each comprising a pressure sensor and a motion sensor both connected to a transmitter;
   providing a single receiver connected to an evaluation device disposed anywhere within the vehicle, the single receiver not dependent upon a signal strength or a specific location in the vehicle;
   attaching a sensing unit from the plurality of sensing units inside each wheel of the vehicle in an identical orientation with respect to the wheel;
   transmitting data on a repeatable basis from the transmitter of each sensing unit, the data comprising a pressure reading data, a rotational speed data, a rotational direction data and an identifier;
   receiving the data by the receiver of the evaluation device;
   determining via the evaluation device whether each sensing unit is located on a right side position or a left side position of the vehicle from the rotational direction data;
   calculating via the evaluation device a distance traveled during a time period of less than 2 seconds of each wheel from the rotational speed data; and
   determining via the evaluation device whether each sensing unit is located in a front wheel position or a rear wheel position by comparing the distance traveled of each left side sensing unit and each right side sensing unit during the time period by recognizing the front wheel travels at least a threshold value multiple or threshold percentage further as compared to the rear wheel when the vehicle is traveling around a corner, wherein the threshold value multiple comprises 1.004 or the threshold percentage comprises 0.4 percent; and
   allocating via the evaluation device a final position of each wheel to the identifier of each sensing unit from the plurality of sensing units.

2. The method of claim 1, determining via the evaluation device a diameter of each wheel by calculating a second distance traveled as common to each wheel when the vehicle is traveling straight.

3. The method of claim 2, normalizing via the evaluation device the diameter of each wheel for use in comparing the distance traveled by each wheel when the vehicle is traveling around the corner.

4. The method of claim 1, wherein the threshold value multiple comprises 1.006 or the threshold percentage comprises 0.6 percent.

5. The method of claim 1, including the step of compiling via the evaluation device each occurrence where the threshold value multiple or threshold percentage is surpassed.

6. The method of claim 5, including the step of utilizing the compiled occurrences for determining whether each sensing unit is located in the front wheel or the rear wheel.

7. The method of claim 6, wherein the compiled occurrences comprises at least 10 times.

8. The method of claim 1, wherein the motion sensor comprises an acceleration sensor or a piezoelectric sensor.

9. The method of claim 1, including the step of providing a steering angle sensor configured to detect when the vehicle is traveling straight or around the corner.

10. The method of claim 1, wherein the receiver is disposed generally in a center of the vehicle.

11. The method of claim 1, including the step of measuring a delay time interval between two signals sent from two different sensing units in either the right side or left side of the vehicle.

12. The method of claim 9, including the step of disregarding when one threshold value multiple or threshold percentage is surpassed when the delay time interval is more than two seconds.

13. The method of claim 1, including the step of sending a wheel slippage data from an ABS sensor located in the vehicle to the evaluation unit.

14. The method of claim 13, including the step of compensating via the evaluation unit the distance traveled of each wheel from the wheel slippage data for use when determining whether each sensing unit is located in the front wheel position or the rear wheel position.

15. A method for determining the relative position of a wheel of a vehicle having an installed sensing unit for a tire pressure monitoring system, comprising:
- providing a plurality of sensing units each comprising a pressure sensor and a motion sensor both connected to a transmitter;
- providing a single receiver connected to an evaluation device disposed anywhere within the vehicle, the single receiver not dependent upon a signal strength or a specific location in the vehicle;
- attaching a sensing unit from the plurality of sensing units inside each wheel of the vehicle in an identical orientation with respect to the wheel;
- transmitting data on a repeatable basis from the transmitter of each sensing unit, the data comprising a pressure reading data, a rotational speed data, a rotational direction data and an identifier;
- receiving the data by the receiver of the evaluation device;
- determining via the evaluation device whether each sensing unit is located on a right side position or a left side position of the vehicle from the rotational direction data;
- calculating via the evaluation device a number of rotations during a time period of less than 2 seconds of each wheel from the rotational speed data; and
- determining via the evaluation device whether each sensing unit is located in a front wheel position or a rear wheel position by comparing the number of rotations of each left side sensing unit and each right side sensing unit during the time period by recognizing the front wheel rotates at least a threshold value multiple or threshold percentage further as compared to the rear wheel when the vehicle is traveling around a corner, wherein the threshold value multiple comprises 1.004 or the threshold percentage comprises 0.4 percent; and
- allocating via the evaluation device a final position of each wheel to the identifier of each sensing unit from the plurality of sensing units.

16. The method of claim 15, determining via the evaluation device a diameter of each wheel by calculating a common distance traveled as common to each wheel when the vehicle is traveling straight, and including the step of normalizing via the evaluation device the diameter of each wheel for use in comparing the number of rotations by each wheel when the vehicle is traveling around the corner.

17. The method of claim 15, including the step of compiling via the evaluation device each occurrence where the threshold value multiple or threshold percentage is surpassed, and including the step of utilizing the compiled occurrences for determining whether each sensing unit is located in the front wheel or the rear wheel, wherein the compiled occurrences comprises at least 10 times.

18. A method for determining the relative position of a wheel of a vehicle having an installed sensing unit for a tire pressure monitoring system, comprising:
- providing a plurality of sensing units each comprising a pressure sensor and a motion sensor both connected to a transmitter;
- providing a single receiver connected to an evaluation device disposed anywhere within the vehicle, the single receiver not dependent upon a signal strength or a specific location in the vehicle;
- attaching a sensing unit from the plurality of sensing units inside each wheel of the vehicle in an identical orientation with respect to the wheel;
- transmitting data on a repeatable basis from the transmitter of each sensing unit, the data comprising a pressure reading data, a rotational speed data and an identifier;
- receiving the data by the receiver of the evaluation device;
- calculating via the evaluation device a distance traveled during a time period of less than 2 seconds of each wheel from the rotational speed data; and
- determining via the evaluation device when the vehicle is traveling around a corner whether each sensing unit is located in a front left wheel position, a front right wheel position, a left rear wheel position or a right rear wheel position by comparing the distance traveled of each sensing unit during the time period by recognizing a rear wheel closest to the corner travels a shortest distance, a front wheel closest to the corner travels a threshold value multiple or threshold percentage distance further than the shortest distance, a rear wheel away from the corner travels a threshold value multiple or threshold percentage distance further than the front wheel closest to the corner and a front wheel away from the corner travels the furthest distance, wherein the threshold value multiple comprises 1.004 or the threshold percentage comprises 0.4 percent; and
- allocating via the evaluation device a final position of each wheel to the identifier of each sensing unit from the plurality of sensing units.

19. A method for determining the relative position of a wheel of a vehicle having an installed sensing unit for a tire pressure monitoring system, comprising:
- providing a plurality of sensing units each comprising a pressure sensor and a motion sensor both connected to a transmitter;
- providing a single receiver connected to an evaluation device disposed anywhere within the vehicle, the single receiver not dependent upon a signal strength or a specific location in the vehicle;
- attaching a sensing unit from the plurality of sensing units inside each wheel of the vehicle in an identical orientation with respect to the wheel;
- transmitting data on a repeatable basis from the transmitter of each sensing unit, the data comprising a pressure reading data, a rotational speed data and an identifier;
- receiving the data by the receiver of the evaluation device;
- calculating via the evaluation device a number of rotations during a time period of less than 2 seconds of each wheel from the rotational speed data; and determining via the evaluation device when the vehicle is traveling around a corner whether each sensing unit is located in a front left wheel position, a front right wheel position, a left rear wheel position or a right rear wheel position by comparing the number of rotations of each sensing unit during the time period by recognizing a rear wheel closest to the corner rotates the least amount of rotations, a front wheel closest to the corner rotates a threshold value multiple or threshold percentage more than the least amount of rotations, a rear wheel away from the corner rotates a threshold value multiple or threshold percentage more than the front wheel closest to the corner and a front wheel away from the corner rotates the most amount of rotations, wherein the threshold value multiple comprises 1.004 or the threshold percentage comprises 0.4 percent; and allocating via the evaluation device a final position of each wheel to the identifier of each sensing unit from the plurality of sensing units.

* * * * *